（12) United States Patent
Bennett et al.

(10) Patent No.: US 6,203,943 B1
(45) Date of Patent: Mar. 20, 2001

(54) ELECTROCHEMICAL CELL HAVING ELECTRODE ADDITIVES

(75) Inventors: Wayne B. Bennett, Westlake; Donna L. Lubin, Cleveland, both of OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/192,251

(22) Filed: Nov. 13, 1998

(51) Int. Cl.[7] .................................................. H01M 4/60
(52) U.S. Cl. .......................... 429/215; 429/229; 429/206; 429/224
(58) Field of Search .................... 429/229, 215, 429/206, 224

(56) References Cited

U.S. PATENT DOCUMENTS

| | | | |
|---|---|---|---|
| 5,424,145 | * 6/1995 | Tomantschger et al. | 429/57 |
| 5,501,924 | 3/1996 | Swierbut et al. | 429/224 |
| 5,569,564 | 10/1996 | Swierbut et al. | 424/224 |
| 5,599,644 | 2/1997 | Swierbut et al. | 429/224 |
| 5,766,789 | * 6/1998 | James et al. | 429/44 |

FOREIGN PATENT DOCUMENTS

| | | | |
|---|---|---|---|
| 62-160659 | * | 7/1987 | (JP) . |
| 7-169464 | * | 7/1995 | (JP) . |
| 2050638 | * | 12/1995 | (RU) . |
| 1786546 | * | 1/1993 | (SU) . |
| 9312551 | | 6/1993 | (WO) . |

* cited by examiner

Primary Examiner—Laura Weiner
(74) Attorney, Agent, or Firm—Robert W. Welsh; Stewart A. Fraser

(57) ABSTRACT

An alkaline electrochemical cell having a barium compound additive in the anode according to one embodiment, and in both the anode and the cathode according to another embodiment. The anode of the present invention comprises an active anode material such as zinc, and an anode additive comprising a barium compound, such as barium sulfate in the amount of up to 8% by weight of active anode materials. According to another embodiment, the cathode of the electrochemical cell comprises an active cathode material, such as manganese dioxide, and also has an additive comprising a barium compound, such as barium sulfate. The anode and cathode of the present invention are particularly adapted for use in an electrochemical cell having an alkaline electrolyte.

11 Claims, 3 Drawing Sheets

ELECTROCHEMICAL CELL HAVING ELECTRODE ADDITIVES

BACKGROUND OF THE INVENTION

The present invention generally relates to electrochemical cells including anode and cathode additives and, more particularly, to alkaline electrochemical cells having cathodes formed of manganese dioxide and other additives, and anodes formed of zinc and other additives.

Conventional alkaline cells generally include a steel cylindrical can having a cathode comprising manganese dioxide as the active material and formed on the interior surface of the steel can, an anode comprising zinc powder and located in the center of the cell, a separator located between the anode and the cathode, and an alkaline electrolyte solution simultaneously contacting the anode, the cathode, and separator. A conductive current collector is commonly inserted into the anode active material and a seal assembly provides closure to the open end of the steel can.

A primary goal in designing alkaline battery cells is to increase the service performance of the cell. The service performance is the length of time for the cell to discharge under a given load to a specific voltage at which the cell is no longer useful for its intended purpose. One approach taken to increase service performance has been to increase the interior volume of the cell in order to increase the amount of active materials within the cell. However, the commercial external size of the cell is generally fixed, thereby limiting the ability to increase the amount of active materials within the cell.

Another approach taken to increase the service performance of a cell is to utilize additives within the electrodes of the cell. For example, U.S. Pat. No. 5,599,644 discloses the use of $SnO_2$, and other similar materials in the cathode. Another example is disclosed in PCT/CA92/00553, having International Publication No. WO93/12551, entitled "CATHODES FOR ZINC MANGANESE DIOXIDE CELLS HAVING BARIUM ADDITIVES." This reference teaches the use of a barium compound additive such as barium sulfate ($BaSO_4$) in an amount of 3% to 25% in the cathode of an electrochemical cell. The aforementioned U.S. Patent and PCT publication are both hereby incorporated by reference. The additives discussed in both references provide for enhanced service performance. Despite past increases in the service performance, the need to find new ways to increase service performance remains the primary goal of cell designers.

SUMMARY OF THE INVENTION

The present invention improves the service performance of an alkaline electrochemical cell by the addition of a barium compound additive to the anode according to one embodiment, and to both the anode and the cathode according to another embodiment. To achieve this and other advantages, and in accordance with the purpose of the invention as embodied and described herein, the anode of the present invention comprises an active anode material such as zinc, and an anode additive comprising a barium compound, such as barium sulfate. According to another embodiment, the cathode of the electrochemical cell comprises an active cathode material, such as manganese dioxide, and also has an additive comprising a barium compound, such as barium sulfate. The anode and cathode of the present invention are particularly adapted for use in an electrochemical cell having an alkaline electrolyte.

These and other features, advantages and objects of the present invention will be further understood and appreciated by those skilled in the art by reference to the following specification, claims and appended drawings.

DETAILED DESCRIPTION OF THE PREFERRED EMBODIMENTS

Figure 1:
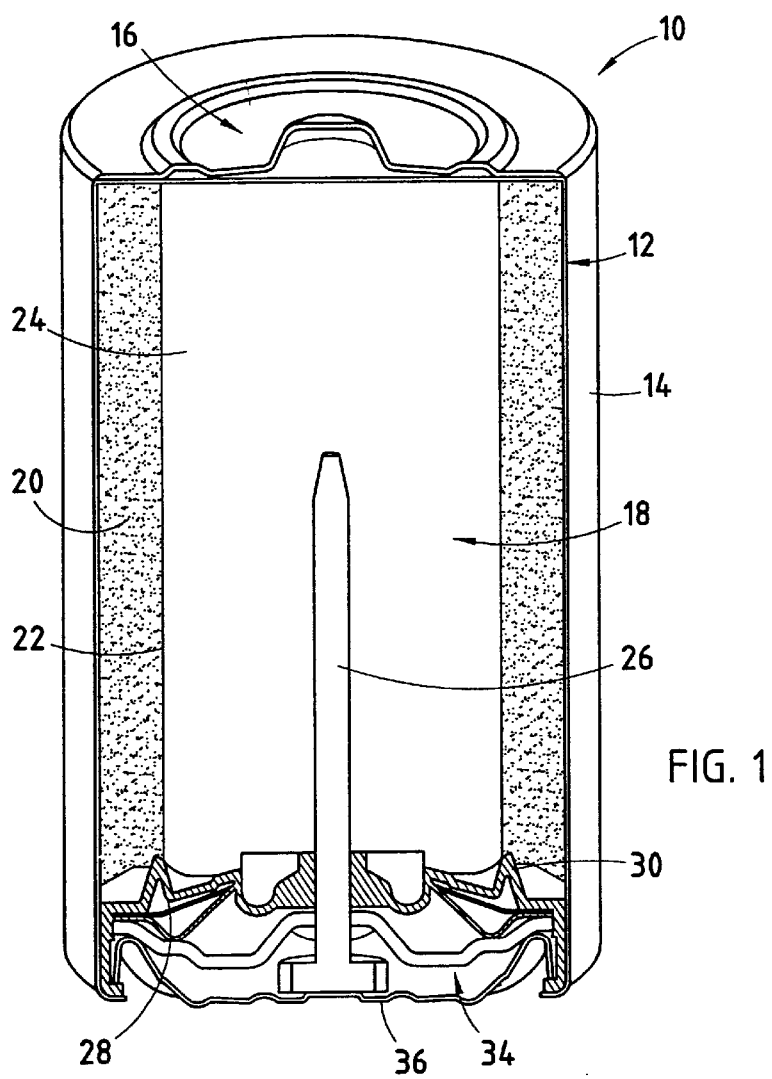
FIG. 1 is a cutaway perspective view of an example of an electrochemical cell constructed in accordance with the present invention.

Referring to FIG. 1, a cutaway view of a cylindrical alkaline electrochemical cell 10 is shown therein. Alkaline cell 10 includes a steel can 12 having a cylindrical shape with a closed bottom end and an open top end. A metalized, plastic film label 14 is formed about the exterior surface of steel can 12, except for the ends of steel can 12. At the closed end of steel can 12 is a positive cover preferably formed of plated steel. Film label 14 is formed over the peripheral edge of positive cover 16.

A cathode 20, preferably formed of a mixture of manganese dioxide, graphite, 45% potassium hydroxide solution, deionized water, and aqueous TEFLON® solution comprising approximately 20% polytetrafluoroethylene, and additives, is formed about the interior surface of steel can 12. Separator 22, which is preferably formed of a non-woven fabric that prevents migration of any solid particles in the cell, is disposed about the interior surface of cathode 20. An electrolyte 24 formed of potassium hydroxide (KOH) is disposed in the can 12, preferably within the interior of separator 22. An anode 18, preferably formed of zinc powder, a gelling agent, and additives is disposed within electrolyte 24 in contact with a current collector 26, which may include a brass nail. Accordingly, the cathode 20 is configured as the cell's positive electrode, and the anode 18 is configured as the cell's negative electrode.

Current collector 26 contacts a brass rivet 28 formed at the open end of steel can 12. A nylon seal 30 is formed at the open end of steel can 12 to prevent leakage of the active ingredients contained in steel can 12. Nylon seal 30 contacts a metal washer 28 and an inner cell cover 34, which is preferably formed of steel. A negative cover 36, which is preferably formed of plated steel, is disposed in contact with current collector 26 via a weld. Negative cover 36 is electrically insulated from steel can 12 by nylon seal 30.

The anode 18 of the present invention contains zinc powder as the electrochemically active material. In addition, the anode 18 of the present invention further contains an anode additive material that has a barium compound, and more preferably includes a barium sulfate ($BaSO_4$) additive. The cathode 20 of the present invention contains electrolytic manganese dioxide ($MnO_2$) (EMD) as the electrochemically active material. In addition, the cathode 20 of the present invention may also contain a cathode additive that has a barium compound, and more particularly has a barium sulfate ($BaSO_4$) additive. It should be appreciated that the electrochemical cell 10 of the present invention has barium sulfate employed in the anode according to one embodiment, and contains barium sulfate employed in both the anode and the cathode according to another embodiment.

Figure 2:
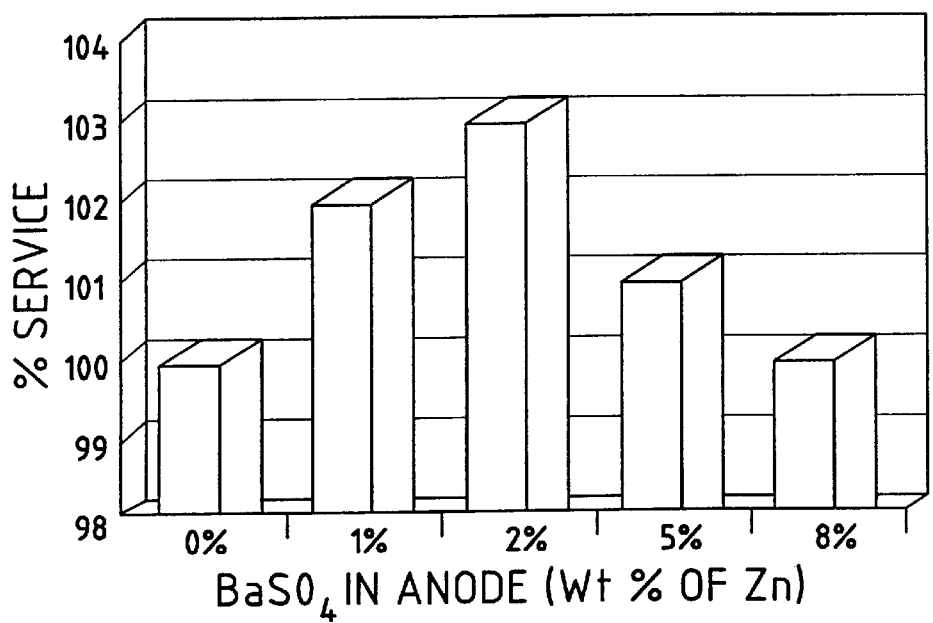
FIG. 2 is a bar graph comparing the percent service performance measured for alkaline electrochemical cells having an anode with different amounts of barium sulfate additive.

According to the first embodiment of the present invention, the anode 18 of electrochemical cell 10 contains barium sulfate additive in the amount of 8% or less by weight of anode active materials. Accordingly, cell 10 contains an amount of barium sulfate no greater than 8% by weight of the amount of zinc employed in the anode 18. Examples of D-size zinc/manganese dioxide alkaline electrochemical cells were assembled containing different amounts of barium sulfate additive in the anode 18. The bar graph shown in FIG. 2 illustrates examples of electrochemical cells and shows a conventional cell having no barium sulfate additive (0%) to those cells having barium sulfate additive to the anode 18 in the amounts of 1%, 2%, 5%, and 8% by weight of total zinc in the anode. In the comparative examples shown, the D-size cells were tested with an intermittent discharge of one hour per day at a resistance of 2.2 ohms, and the service performance cutoff was measured at 0.8 volts. In contrast to the control cell having no barium sulfate, it was discovered that the use of barium sulfate additive to the anode 18 in the amount of up to 8% by weight of the anode active material realized an increase in the service performance of the cell. The greatest performance increase is shown with approximately 2% barium sulfate additive by weight percent of zinc.

Figure 3:
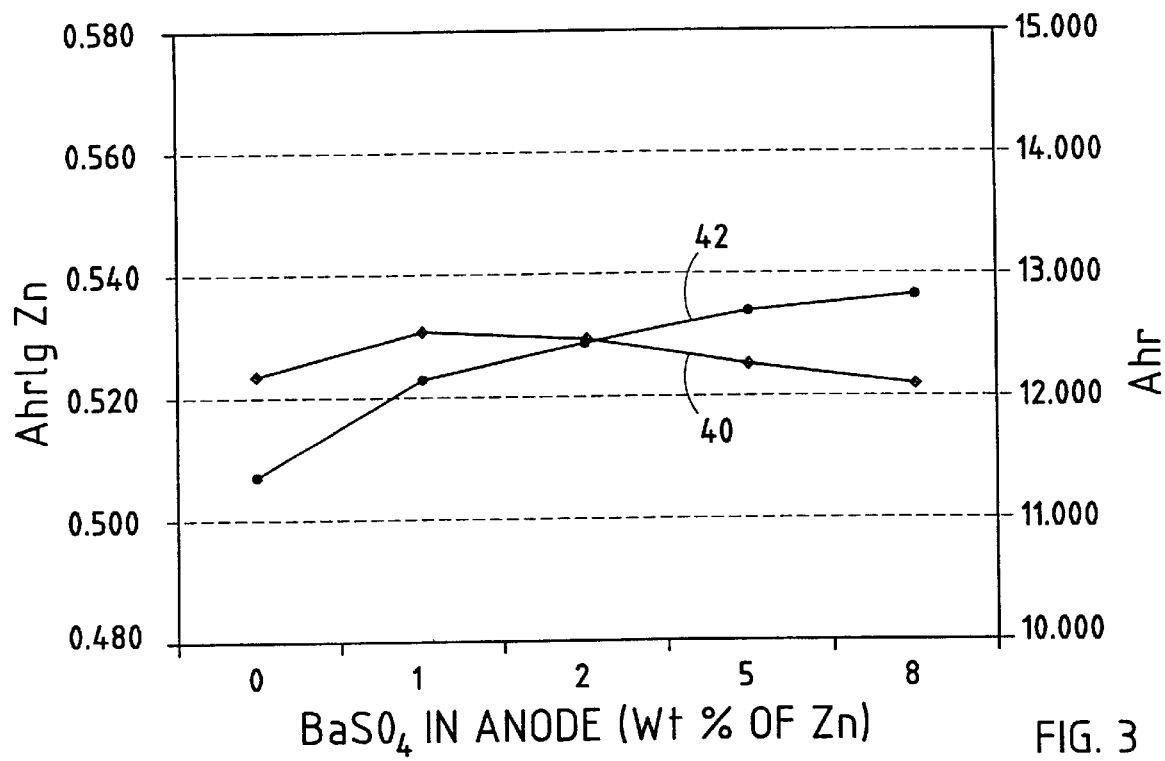
FIG. 3 is a graph further illustrating measured service performance of the alkaline electrochemical cells having an anode with a barium sulfate additive.

Referring to FIG. 3, the effect of the barium sulfate additive to anode 18 for the examples provided in FIG. 2 were measured and plotted for both amp hours as represented by line 40, and amp hours per gram of zinc as represented by line 42. Both the measured amp hours data 40 and amp hours per gram of zinc data 42 show an increase in the cell's current performance for amounts of barium sulfate additive up to 8% by weight of zinc in the anode 18.

Figure 4:
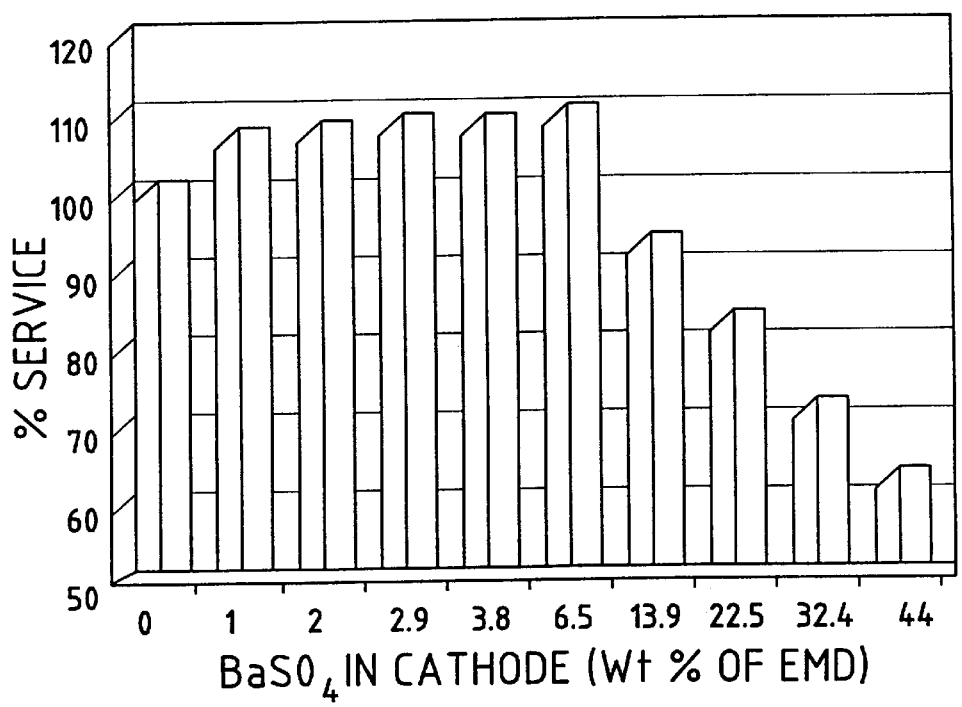
FIG. 4 is a bar graph comparing the percent service performance of electrochemical cells having a cathode with different amounts of barium sulfate additive.
Figure 5:
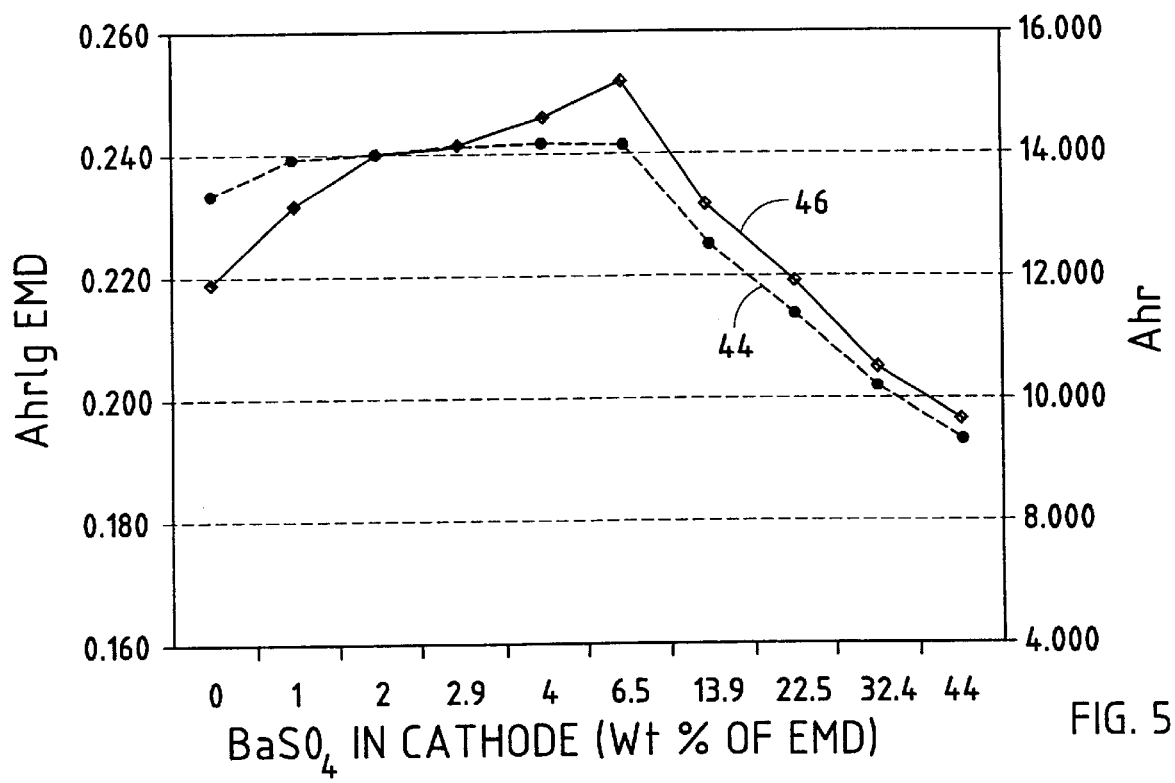
FIG. 5 is a graph further illustrating measured service performance of the alkaline electrochemical cells having a cathode with different amounts of barium sulfate additive.

Referring to FIG. 4, the effect of adding barium sulfate additive to the cathode 20 was determined by evaluating different amounts of barium sulfate by weight percent of electrolytic manganese dioxide (EMD) in the cathode 20. The cells tested were D-size cylindrical cells tested intermittently by discharging one hour per day at a resistance of 2.2 ohm to a voltage cutoff of 0.8 volts. As shown, the addition of barium sulfate additive to the cathode 20 provided a service performance increase when used in the amount of up to approximately 10.2% by weight of total EMD. It was realized that significant service performance increases could be realized in the amount of up to 2.9% barium sulfate additive by weight percent of the EMD in the cathode 20. The effect of the barium sulfate additive on the D-size cells shown in FIG. 4 is further illustrated in FIG. 5. As shown, line 44 represents the measured amps hours and line 46 represents the measured amp hours per gram of EMD. The graph shows that an increase in amps hours and amp hours per gram is realized with barium sulfate additive in the amount of up to 10.2% by weight percent of EMD in the cathode 20.

Figure 6:
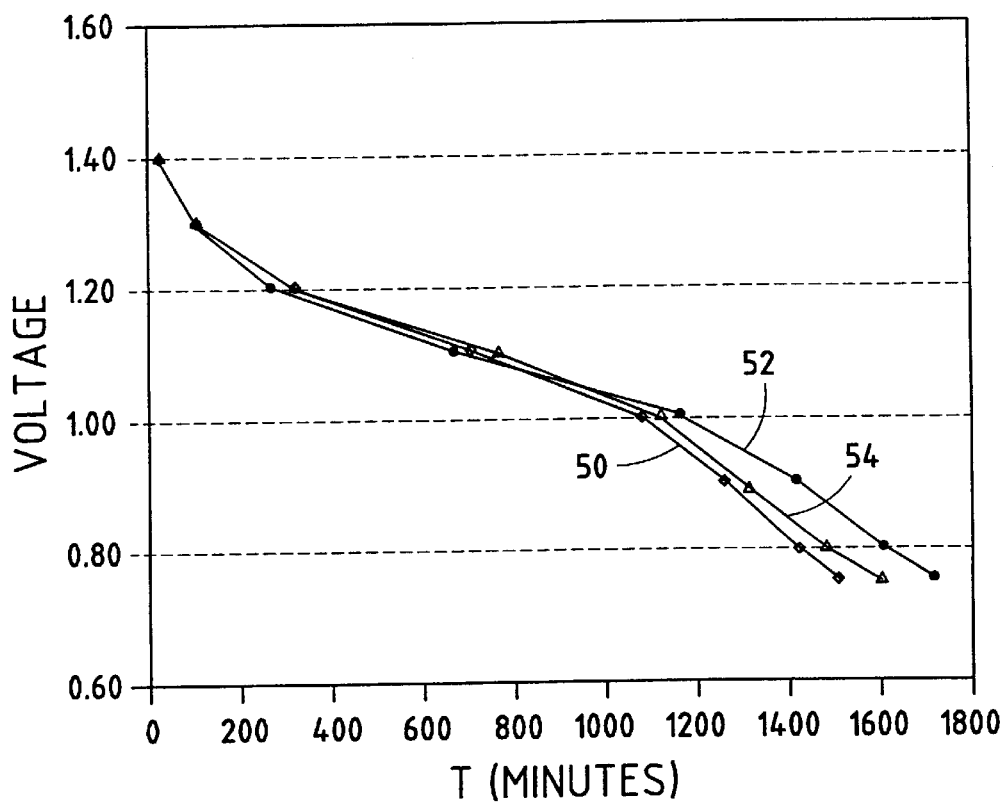
FIG. 6 is a comparative graph illustrating service performance of a standard alkaline cell having no additives as compared to an electrochemical cell having an anode with barium sulfate additive, and an electrochemical cell having both the anode and cathode containing barium sulfate additive.

According to another embodiment, both the anode 18 and cathode 20 of electrochemical cell 10 contain barium sulfate additive to achieve enhanced service performance of the cell 10. According to this embodiment, barium sulfate is added to the anode in the amount of approximately 2% by weight of active anode material (zinc), and barium sulfate is also added to the cathode in the amount of 2% by weight of active cathode material (manganese dioxide). A D-size cylindrical cell was assembled and tested by being intermittently discharged one hour per day at a resistance to 2.2 ohms, and the voltage measurement is shown in FIG. 6. The service performance realized for the electrochemical cell containing barium sulfate in both the anode and cathode is represented by line 52. In contrast, the service performance realized with a similar cell having barium sulfate in the anode only is shown by line 54. As a comparison, a control cell was constructed having no barium sulfate in either the anode or cathode, and its test results are shown by line 50. According to this experiment, the cell containing barium sulfate in both the anode and cathode realized an increase in the average service performance of D-sized cells, according to this test, by as much as 13%, as compared to the average performance of the control cell having no barium sulfate additive.

Accordingly, the present invention advantageously provides for enhanced service performance by employing an anode containing barium sulfate additive in the amount of up to 8% by weight of zinc. According to another embodiment, the present invention further provides for increased service performance by employing barium sulfate additive in both the anode and cathode of the cell. According to the second embodiment, superior performance results were achieved by employing approximately 2% by weight of active electrode materials in each of the anode and cathode.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. An electrochemical cell having an anode, a cathode, and an electrolyte, said anode comprising a zinc active material and an anode additive comprising barium sulfate ($BaSO_4$).

2. The electrochemical cell as defined in claim 1, wherein said anode comprises barium sulfate in an amount of up to 8% by weight of anode active material.

3. The electrochemical cell as defined in claim 1, wherein said cathode comprises an active material and an additive comprising a barium compound.

4. The electrochemical cell as defined in claim 3, wherein said barium compound comprises barium sulfate.

5. The electrochemical cell as defined in claim 3, wherein said active material of said cathode comprises manganese dioxide.

6. The electrochemical cell as defined in claim 3, wherein said cathode additive comprises approximately 2% by weight of active cathode material, and said anode additive comprises approximately 2% by weight of anode active material.

7. An electrochemical cell having an anode, a cathode, and an electrolyte, said anode comprising a zinc active material and an anode additive comprising barium sulfate in an amount up to 8% by weight of zinc active material.

8. An electrochemical cell having an anode, a cathode, and an electrolyte, said cathode comprising a manganese dioxide active material and a cathode additive comprising a barium compound, said anode comprising a zinc active material and an anode additive comprising barium sulfate.

9. The electrochemical cell as defined in claim 8, wherein said barium compound comprises barium sulfate.

10. The electrochemical cell as defined in claim 9, wherein said anode additive comprises approximately 2% by weight of said anode active material, and said cathode additive comprises approximately 2% by weight of said cathode active material.

11. An electrochemical cell having an anode, a cathode, and an electrolyte, said cathode comprising a manganese dioxide active material and a cathode additive comprising approximately 2% barium sulfate, said anode comprising a zinc active material, and an anode additive comprising approximately 2% barium sulfate.

* * * * *